United States Patent [19]

Mepham et al.

[11] Patent Number: 5,253,151
[45] Date of Patent: Oct. 12, 1993

[54] LUMINAIRE FOR USE IN BACKLIGHTING A LIQUID CRYSTAL DISPLAY MATRIX

[75] Inventors: Thomas A. Mepham, Hiawatha; Roger D. Eller, Cedar Rapids; Gerald L. Vick, Mt. Vernon, all of Iowa

[73] Assignee: Rockwell International Corporation, Seal Beach, Calif.

[21] Appl. No.: 767,735

[22] Filed: Sep. 30, 1991

[51] Int. Cl.⁵ ............................................. F21V 7/09
[52] U.S. Cl. ................................. 362/216; 362/347; 362/297; 362/241; 359/49
[58] Field of Search ............. 362/236, 237, 240, 241, 362/247, 346, 347, 341, 260, 297, 23, 29; 359/49 X

[56] References Cited

U.S. PATENT DOCUMENTS

| | | | |
|---|---|---|---|
| 3,748,460 | 7/1973 | Price | 362/347 |
| 4,344,111 | 8/1982 | Ruud et al. | 362/241 |
| 4,425,604 | 1/1984 | Imai et al. | 362/240 |
| 4,514,793 | 4/1985 | Andreasen | 362/347 |
| 4,719,546 | 1/1988 | Spitz | 362/241 |
| 4,729,075 | 3/1988 | Brass | 362/346 |
| 4,794,501 | 12/1988 | Bartenbach | 362/260 |
| 4,843,521 | 6/1989 | Plofchan | 362/346 |
| 4,912,614 | 3/1990 | Goldenburg | 362/347 |
| 4,947,305 | 8/1990 | Gunter, Jr. | 362/346 |
| 5,067,053 | 11/1991 | Akizuki | 362/347 |
| 5,089,943 | 2/1992 | Wölfelschneider | 362/260 |

*Primary Examiner*—Albert J. Makay
*Assistant Examiner*—L. Heyman
*Attorney, Agent, or Firm*—John J. Horn; Gregory G. Williams; H. Fredrick Hamann

[57] ABSTRACT

A luminaire including one or more fluorescent tubes and associated reflectors for use in backlighting a projection type liquid crystal display matrix. The reflectors have special arcuate shapes designed to forwardly project light to the display matrix and also to direct diffuse light outward from behind the fluorescent tubes so that all of the light generated by the tubes can be efficiently projected for use in illuminating the display matrix.

9 Claims, 4 Drawing Sheets

LUMINAIRE FOR USE IN BACKLIGHTING A LIQUID CRYSTAL DISPLAY MATRIX

BACKGROUND OF THE INVENTION

The present invention relates to liquid crystal displays and more particularly to luminaires for backlighting liquid crystal display matrixes.

Projection type liquid crystal displays require proper backlighting to assure good performance. The intensity of illumination should be substantially uniform across the display matrix and the light provided should preferably be at least partially collimated. Furthermore, in many applications such as for aircraft instrumentation the luminaire must be as compact as possible since the available space is very limited and should preferably have a thin planar shape for convenient attachment to the back of the display matrix.

In the past luminaires for use in backlighting liquid crystal display matrixes have ordinarily been constructed of fluorescent tubes aligned edge to edge to form a solid bank of lighting devices. In this way all of the light from the front surfaces of the tubes is used in providing light of relatively uniform intensity across the entire bank. However, this arrangement is not efficient since very little light is used from the backsides of the tubes. Parabolic type reflectors have been employed in some luminaire designs for reflecting light from the rear surfaces of fluorescent tubes used as lighting sources. Unfortunately, this style of reflector is not well suited to use with fluorescent tubes which are not like line sources and consequently very little gain in efficiency is actually obtained through the use of such reflectors.

It is therefore an object of the present invention to provide a luminaire for use in backlighting projection type liquid crystal display matrixes having improved efficiency which provides light of relatively uniform intensity across the back of the display matrix.

It is another object of the present invention to provide a luminaire for use in backlighting liquid crystal display matrixes which is compact in design having a thin and planar shape well adapted for attachment to the back of a liquid crystal display matrix.

It is a further object of the present invention to provide a luminaire for use in backlighting liquid crystal display matrixes which provides at least partially collimated light to the display matrixes and efficiently makes use of the light emitted from the backsides of fluorescent tubes used as lighting sources.

SUMMARY OF THE INVENTION

The present invention comprises a luminaire for backlighting a projection type liquid crystal display matrix including one or more fluorescent tubes and one or more reflectors which are specially designed to make use of the light from the rear surfaces of the fluorescent tubes in directing more light for backlighting the matrix.

In a first embodiment, the reflectors are constructed in accordance with the principles of non-imaging optics so that all of the light emitted from the surfaces of the fluorescent tubes which is reflected back by the reflectors so as to graze the surfaces of the fluorescent tubes and be projected laterally outward and forward toward the liquid crystal display matrix.

In a second embodiment, the reflectors are constructed generally in the form of a parabola adapted for partially collimating the light from the fluorescent tubes but having a modified shape along its inner section adapted for reflecting light laterally outward and forward from behind the fluorescent tubes so that this diffuse light can be utilized by the luminaire.

DESCRIPTION OF THE PREFERRED EMBODIMENT

Figure 1:
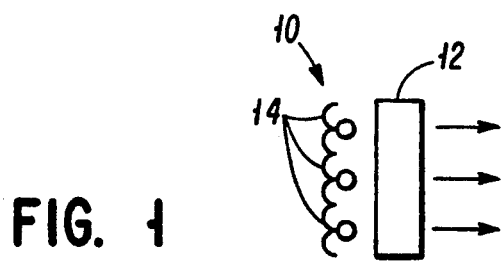
FIG. 1 provides a diagramatic view of the configuration of the luminaire of the present invention with respect to a liquid crystal display matrix.

Referring now to FIG. 1, the present invention provides a luminaire 10 for backlighting a liquid crystal display ("LCD") matrix 12 made up of a multiplicity of LCD pixels which may be individually controlled to form images. The luminaire 10 directs light forward onto the backside of the display matrix 12 for use in illuminating the matrix by projection through the LCD pixels making up the matrix. It is preferable if the light from the luminaire 10 is at least partially collimated to fall on the rear surface of the display matrix at right angles (i.e. orthoginally) to the plane defined by the matrix 12 itself. The light passing through the matrix 12 may be intercepted by a diffuser (not shown) in order to enhance the viewing of images at oblique angles.

Figure 2:
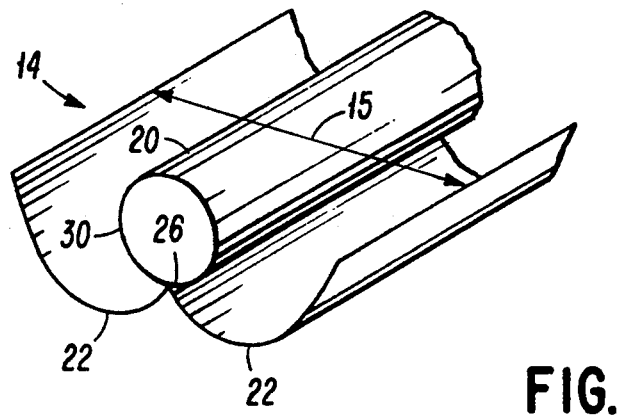
FIG. 2 provides a perspective view of one of the light generating units including a fluorescent tube and associated reflectors which comprise the luminaire of the present invention.

The luminaire 10 is comprised of three (or more) separate light generating units 14 of similar construction. As shown in FIG. 2 each of the light generating units 14 includes a cylindrical fluorescent tube 20 and a pair of arcuately shaped reflectors 22 extending laterally outward on opposite sides of the tube 20 for reflecting light emitted by the tube and defining a lateral aperture 15 for the unit 15 of width 2A. The reflectors 22 are designed with a special arcuate shape for reflecting light from the rear surfaces or backsides 26 of the fluorescent tube 20 so that the diffuse light emitted from along the backside 26 of the tube 20 can also be utilized in illuminating the liquid crystal display matrix 12.

The exact construction and shape of the arcuate reflectors 22 is critical to the efficiency of the light generating units 14 making up the luminaire 10. Assuming that all dimensions along the Z axis (along the length of the fluorescent tube 20) are held constant, the reflectors 22 may be designed with respect to an x-y plane (x-forward direction, y-lateral direction) orthoginal to the long axis of the tube 20. It is believed that optimum performance may be achieved when each of the reflectors 22 presents a forward directed aperture 25 to the matrix 12 which is approximately equal in lateral width A to one-half of the circumference of the tube (i.e. $A = \pi R$ where R equals the tube radius) with an average luminance substantially equal to the luminance of the surface of the tube 10 itself. Assuming that the fluorescent tube 20 emits light as a Lambertian surface of diameter D and that the reflectors 22 are made of a perfectly specular reflecting material, an approach may be defined for designing the individual reflectors to obtain the aperture and luminance objectives referred to above. Since the reflectors are constructed with the same arcuate shapes, the construction of a single reflector 22 will be described as representative of the construction of all of the reflectors employed by the light generating units 14 making up the luminaire 10.

The reflector 22 is designed such that a ray emitted from the surface 30 of the tube 10 which is tangential to the surface 30 will be directed back upon itself and pass by the tube 20 at a grazing incidence. As a result the surface of the reflector 22 will be at all points normal to a tangent to the tube 20.

Figure 3:
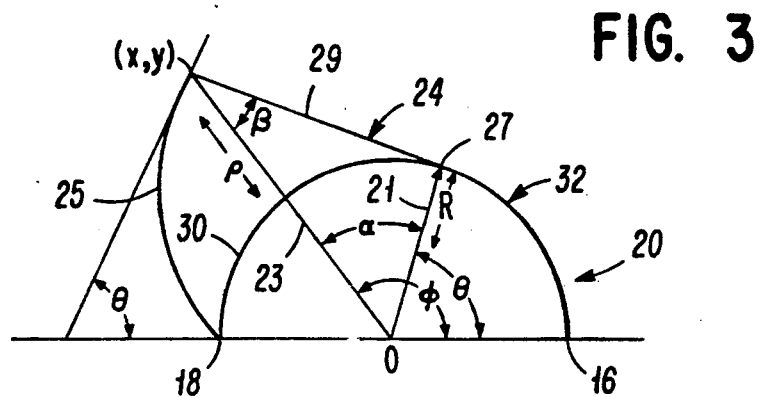
FIG. 3 provides a geometric diagram illustrating the mathematical derivation of the curve corresponding to the shape of the reflector of the first embodiment of the present invention.

Referring now to FIG. 3, a mathematical expression for the shape of the reflector 22 may be derived with reference to a semicircular cross section 32 of one-half a fluorescent tube 20. A string 24 is secured to the forwardmost point 16 of the tube 20 and is wrapped around the arc of the tube 20 to point 18 which is diametrically opposite to point 16. If the string 24 is released at point 18 and unwrapped round the cross-section 32 while stretched tight then its free end point (x,y) will simultaneously be tangent to the semicircle 32 and be normal to the curve 28 traced out by the end point (x,y) as the string 24 is unwrapped. In accordance with the Pythogorean Theorem, the length $\rho$ of the radius vector 23 to the point (x,y) maybe defined in terms of the radial dimension R of the tube (length of radius 21) and angle $\theta$ to a radius 21 extending to the tangent point 27 as shown in Equation 1 below:

$$\rho^2 = R^2 + [(\pi - \theta)R]^2. \tag{1}$$

Since the total length of the string 24 is equal to $\pi R$ and the length of free (i.e. unwrapped) section 29 of the string 24 is equal to $(\pi - \theta)R$, then the Equation 1 maybe simplified as shown in Equation 2 below:

$$\rho = R(1 + (\pi - \theta)^2)^{\frac{1}{2}}. \tag{2}$$

Further, the angle $\phi$ to the radius vector $\rho$ may be defined in terms of the angle $\theta$ as shown in Equation 3 below:

$$\phi = \theta + \tan^{-1}(\pi - \theta). \tag{3}$$

The desired shape of the curve 28 for the reflector surface may therefore be given by parametric Equations 4 and 5 in polar coordinates or by corresponding parametric Equations 6 and 7 in Cartesian coordinates as shown below:

$$\rho = R(1 + (\pi - \theta)^2)^{\frac{1}{2}}, \tag{4}$$

and $$\phi = \theta + \tan^{-1}(\pi - \theta); \tag{5}$$

or $$x = \rho \cos \phi, \tag{6}$$

and $$y = \rho \sin \phi. \tag{7}$$

Figure 4:
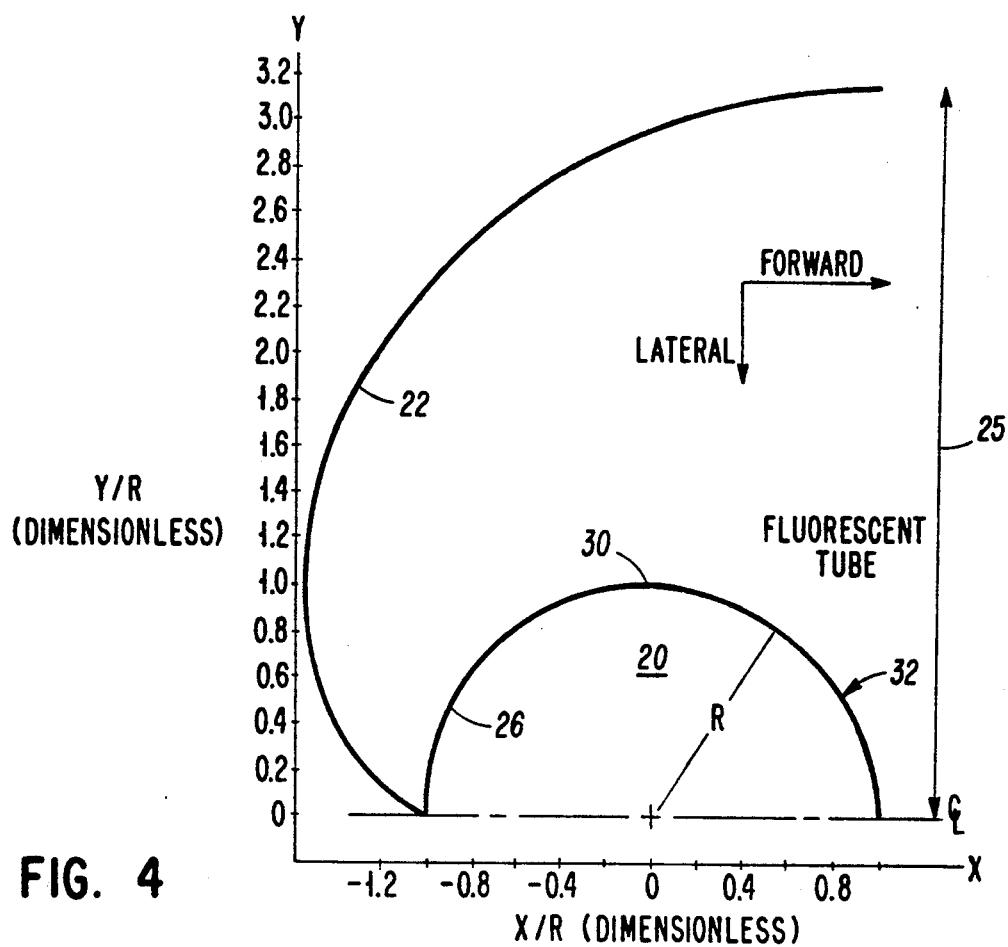
FIG. 4 provides a graph illustrating the arcuate shape of a reflector constructed in accordance with the principles of the first embodiment of the present invention.

Referring now to FIG. 4, the shape of a reflector 22 in accordance with the equations 4-7 is shown in greater detail. It should be noted that the curve 28 presents a reflector aperture 25 in the forward direction of the reflector 22 equal in lateral width A to $\pi R$.

Alternatively, the reflector 22 may be designed so that the outer portion of the reflector is parabolic in shape for reflecting and partially collimating light from a fluorescent tube 10 while the inner portion in proximity to the fluorescent tube 10 is shaped so that light from the tube 10 falling upon its surface is reflected at an angle which is sufficient to clear the tube 10 but which is limited with reference to the desired maximum display matrix off-axis viewing angle (e.g. 35°). The outer and inner portions of the reflector 22 may then be connected or "blended" to form a composite arc.

Figure 5:
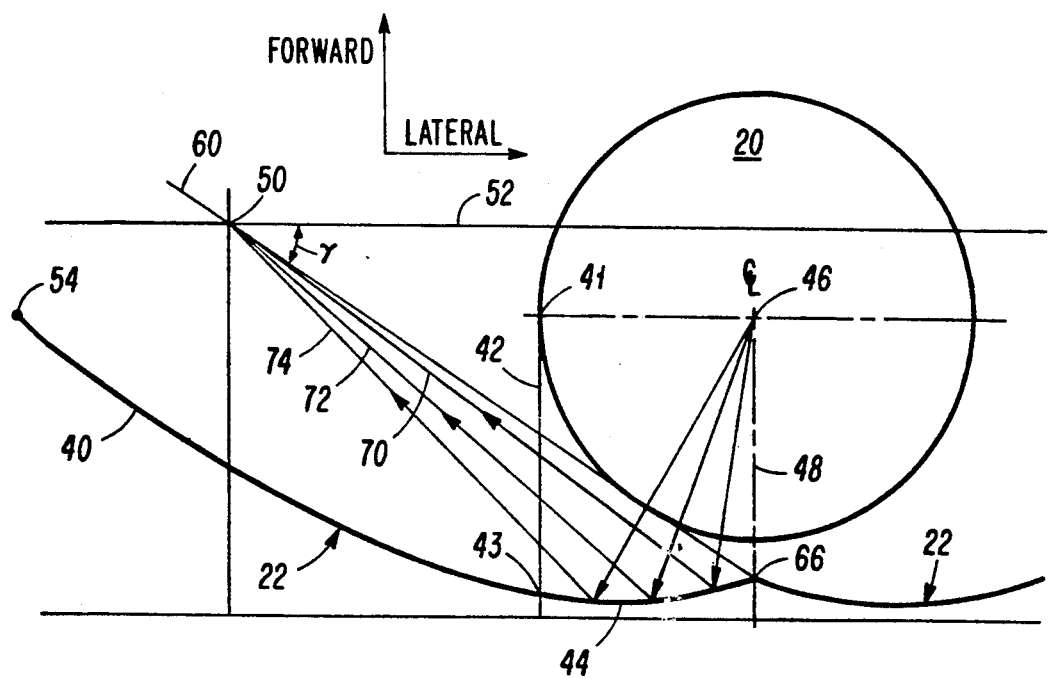
FIG. 5 provides a graph illustrating the arcuate shape of a reflector constructed in accordance with the principles of the second embodiment of the present invention.

Referring now to FIG. 5, the shape of the reflector 22 may be described with respect to the lateral and forward directions and with reference to a cross-section of a fluorescent tube 10. The outer section 40 of the reflector 22 extends laterally outward from the reflector's intersection point 43 with a tangent line 42 which is parallel to the forward direction and also tangent to the surface of the tube 10 at point 41. The outer section 40 is parabolic in shape with respect to the center 46 of the tube 20. The inner section 44 of the reflector 22 extends laterally inward from the intersection point 43 with the tangent line 42 to the center line 48 of the tube 10 and is shaped to reflect light laterally outward and forward from behind the tube 10 toward the liquid crystal display matrix 12. The inner section 44 of the reflector 22 is designed for this purpose in accordance with ray tracing techniques. The inner section 44 is constructed with reference to a point 50 on a line 52 perpendicular to forward direction which passes across tube 10 at a level above the distal end point 54 of the reflector 22 and yet below the forwardmost point 16 of the tube 10. The lateral position of the point 50 is defined by a line 60 which intersects the line 52 at a fixed angle Y equal to the maximum desired off-axis viewing angle for the matrix 12 and which is tangent to the surface of the tube 10. The intersection of the line 60 with the center line 48 of the tube 10 determines the proximal end point 66 of the reflector 22.

The shape of the inner section 44 of the reflector 22 is then defined by ray tracing from the center 46 of the tube 10 to the point 50 as illustrated by the rays 70, 72 and 74. The inner section 44 is curved to enable the all possible rays from the center 46 which intercept the reflector 22 to be reflected through the point 50. The outer section 40 the reflector 22 is constructed to have a parabolic shape focused with respect to the center 46 of the tube 10 and curved sufficiently to bring the distal end point 54 of the reflector up forward to a level in proximity to the level of the center 46 of the tube 20. However, the degree of curvature of the section 42 is somewhat variable being governed by the compactness requirements of luminaire 10 as well as the requirements for uniform illumination across the luminaire 10 and the spacing between the fluorescent tubes 20 of the light generating units 14.

Figure 6:
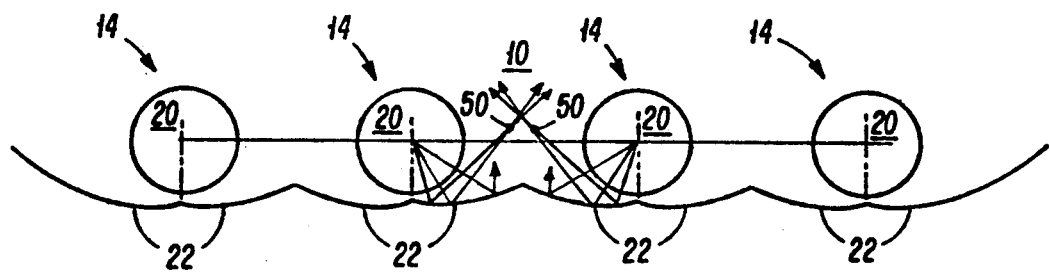
FIG. 6 provides a cross-sectional view of a luminaire including reflectors constructed in accordance with the principles of the second embodiment of the present invention.

Referring now to FIG. 6, the luminaire 10 comprises multiple light generating units 14 each having a pair of reflectors 22. The reflectors 22 all have modified parabolic shapes including inner sections 44 designed to reflect light forward and laterally outward. It should be noted that the reflectors 22 should have inner sections 44 designed to reflect the diffuse light (from the backsides 26 of the tubes 20) forward to the matrix 12 in a complementary fashion. The points 50 through which the diffuse light passes should be selected to avoid overlap between the different areas of the matrix 12 illuminated by the diffuse light from adjacent reflectors. Furthermore, it should be noted that the lateral positioning of the points 50 should be constrained to avoid the interception of reflected light by adjacent tubes.

Figure 7A:
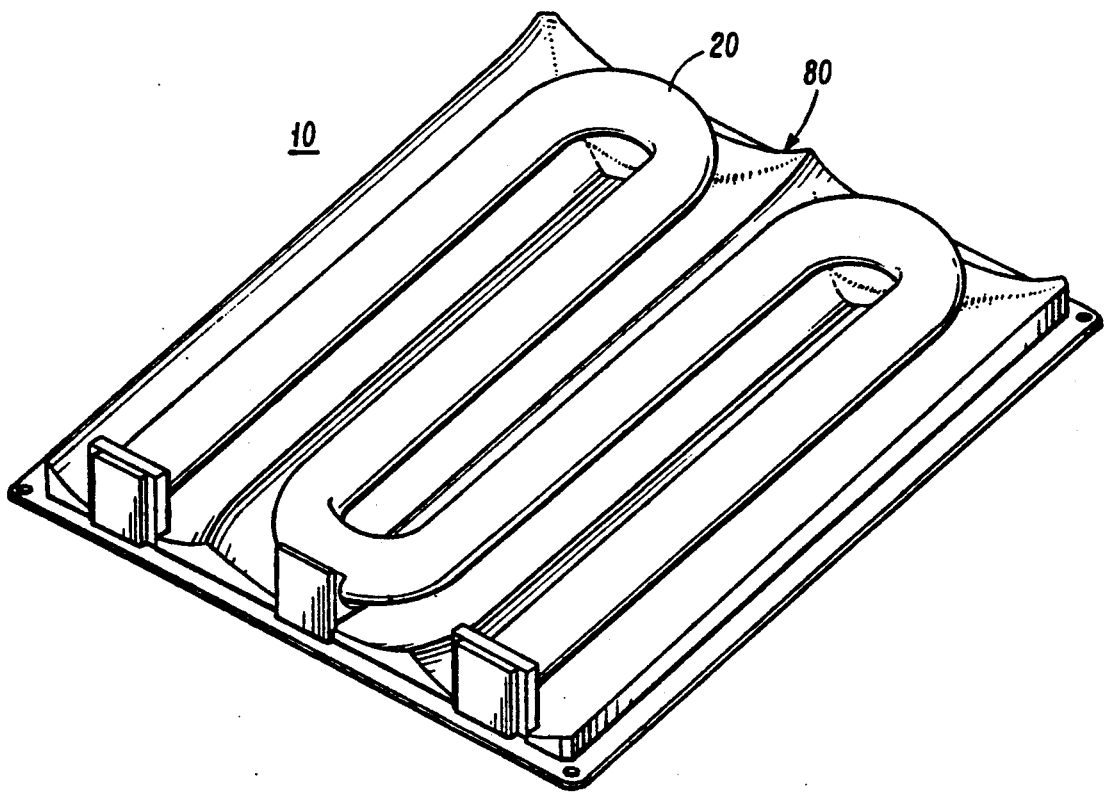
FIGS. 7A and 7B provide prospective views of a luminaire and reflective assembly utilizing a single fluorescent tube and reflective assembly constructed in accordance with the principles of the second embodiment of the present invention.
Figure 7B:
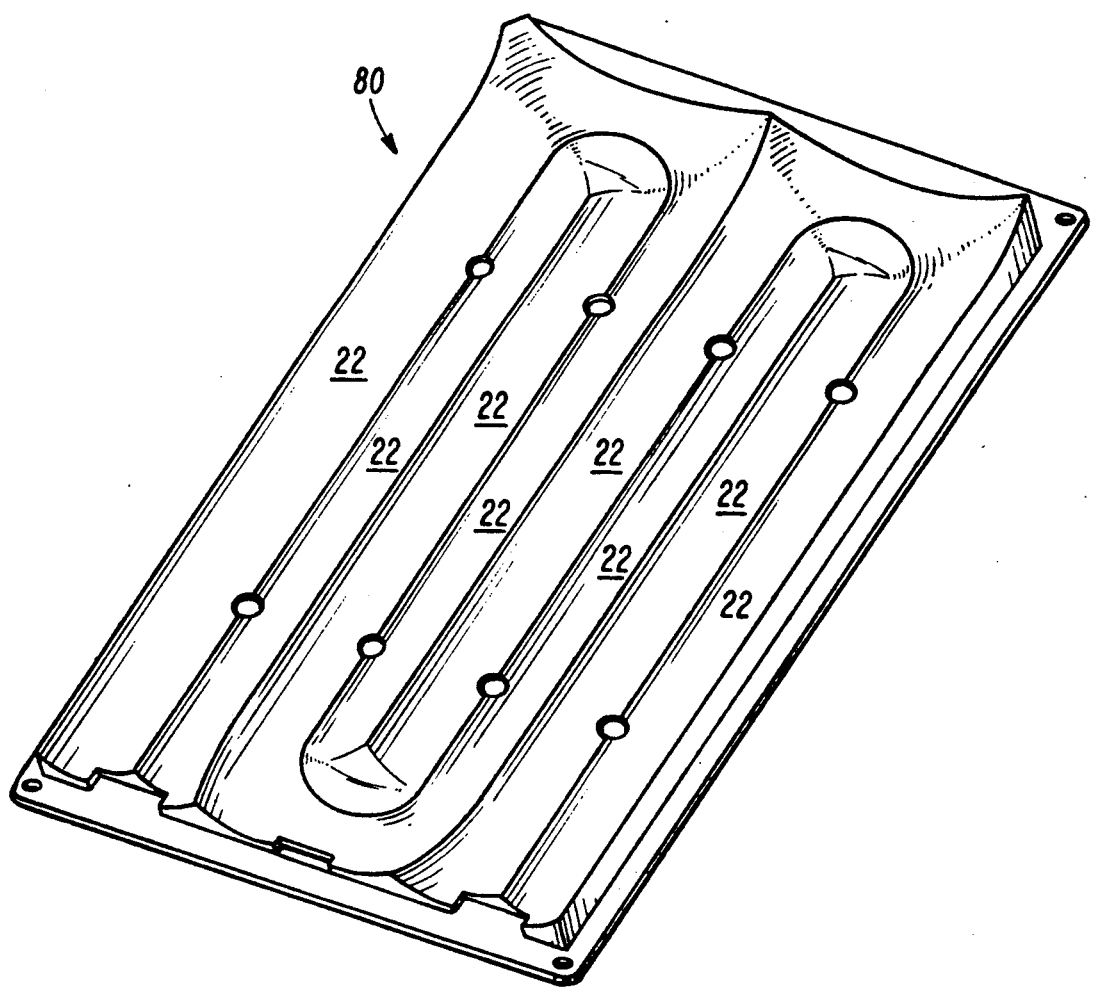

Referring now to FIGS. 7A and 7B, a luminaire 10 is illustrated comprising a single serpentine fluorescent tube 20 and a single piece reflection assembly 80 incorporating multiple reflectors 22 articulated to follow the path of the tube 10 with the reflector geometry being swept about the center of the tube in three dimensions. The tube 20 is selected in size and length to provide light sufficient to illuminate an entire liquid crystal display matrix 12. The reflection assembly is designed to ensure that uniform levels of illumination (i.e. 20% maximum variation) are maintained across the entire luminaire 10, including its edges, while compactness objectives are also attained. The inner portion 44 of the reflector 22 is curved sufficiently upward (i.e. forward) from the inner end of the outer section 40 to reflect substantially all of the diffuse light from the tube 20 laterally outward and forward from the vicinity of the tube 20 so that it can be efficiently utilized in illuminating the display matrix 12. The inner portion 44 and outer portion 40 of the reflector are joined into a composite arc which is swept about the center 46 of the fluorescent tube 20 so as to result an arcuate reflector 22 which is geometrically smooth in all directions and which is adapted for projecting partially collimated light across the entire backside of a liquid crystal display matrix 12.

While particular embodiments of the present invention have been shown and described, it should be clear that changes and modifications may be made to such embodiments without departing from the true scope and spirit of the invention. It is intended that the appended claims cover all such changes and modifications.

We claim:

1. A reflector for use in conjunction with a tubular fluorescent lamp for backlighting a liquid crystal display matrix, comprising:
    a light reflecting surface extending out from the surface of said lamp in an arc approximately defined in two dimensions x and y by the parametric equations:

$x = \rho \cos\phi$ $y = \rho \sin\phi$ where:
    x = lateral distance from lamp center point perpendicular to the intended direction of light projection,
    y = forward distance from lamp center point parallel to the intended direction of light emission,
    $\rho$ = radial distance to point (x,y) defined as $\rho = R(1 + (\pi - \theta)^2)^{\frac{1}{2}}$,
    $\phi$ = angle between a horizontal line through lamp center and a line extending from lamp center to point (x,y) where $\phi$ is defined as $\phi = \theta + \tan^{-1}(\pi - \theta)$; and, $\theta$ = angle between a horizontal line through lamp center point and a second radius extending to the point at which a line perpendicular to the reflective surface at point (x,y) is tangent to the surface of the lamp.

2. The reflector of claim 1, wherein the reflecting surface presents an aperture in the forward direction equal to $\pi R$ in width where R is the radial distance characteristic of the fluorescent lamp.

3. A reflector for use in forwardly projecting and partially collimating light from a fluorescent tube, comprising:
    a first inner section designed to reflect substantially all of the diffuse light emitted from the backside of said tube through a single point laterally outward of said tube and forward of the center of said tube; and
    a second outer section having a parabolic shape with respect to said tube which is designed to partially collimate the light emitted by said tube.

4. The reflector of claim 3, wherein said inner section and said outer section of said reflector are joined at a point of intersection of said reflector with a tangent to said tube parallel to the forward direction in which light is projected by the reflector.

5. A luminaire comprising:
    a fluorescent tube, having a center, a frontside and a backside,
    a first inner reflector section designed to reflect substantially all of the diffuse light emitted from the backside of said tube through a single point laterally outward of said tube and forward of the center of said tube,
    a second outer reflector section having a parabolic shape with respect to said tube which is designed to partially collimate the light emitted by said tube, and
    a liquid crystal matrix disposed forward of the center of said tube, so that said frontside of said tube faces toward said matrix.

6. A luminaire for use in backlighting a projection type liquid crystal display matrix, comprising:
    a plurality of fluorescent tubes for generating fluorescent light having frontsides facing said matrix and backsides facing away from said matrix,
    a plurality of arcuate reflectors, two of which are associated with each of said tubes and which are shaped to project light toward said matrix and to reflect light emitted from the backsides of said tubes laterally outward and forward from said tubes so that it can also be projected toward said matrix,
    wherein said arcuate reflectors have light reflecting surfaces extending out from said tubes in arcs approximately defined in two dimensions x and y be the parametric equations:

$x = \rho \cos\phi$ $$y = \rho \sin\phi$$

where:
- x = lateral distance from lamp center point perpendicular to the intended direction of light projection,
- y = forward distance from lamp center point parallel to the intended direction of light projection,
- ρ = radial distance to point (x,y), and
- φ = angle between a horizontal line through lamp center point and a second radius extending to the point at which a line perpendicular to the reflective surface at point (x,y) is tangent to the surface of the lamp.

7. A luminaire for use in backlighting a projection type liquid crystal display matrix, comprising:
- a plurality of fluorescent tubes for generating fluorescent light having frontsides facing said matrix and backsides facing away from said matrix,
- a plurality of arcuate reflectors, two of which are associated with each of said tubes and which are shaped to project light toward said matrix and to reflect light emitted from the backsides of said tubes laterally outward and forward from said tubes so that it can also be projected toward said matrix, wherein said arcuate reflectors have light reflecting surfaces including:
- an inner section designed to reflect substantially all of the diffuse light emitted from the backside of said tube through a single point laterally outward of said tube and forward of the center of said tube, and
- an outer section having a parabolic shape with respect to said tube which is designed to partially collimate the light emitted by said tube.

8. The reflector of claim 7, wherein said inner section and said outer section of said reflector are joined at a point of intersection of said reflector with a tangent to said tube parallel to the forward direction in which light is projected by the reflector.

9. The reflector of claim 7, wherein said single point through which said diffuse light is reflected is positioned with respect to said tube, reflector and matrix so that the diffuse light reflected by different reflectors is projected forward in a complementary fashion in order to avoid substantial overlap of areas of the matrix illuminated by this light.

* * * * *